No. 743,887. PATENTED NOV. 10, 1903.
I. KITSEE.
APPARATUS FOR REGULATING THE FLOW OF CURRENT IN ELECTRIC CIRCUITS.
APPLICATION FILED MAR. 1, 1901.
NO MODEL.

Witnesses
H. B. Hallock.

Inventor
Isidor Kitsee

No. 743,887. Patented November 10, 1903.

UNITED STATES PATENT OFFICE.

ISIDOR KITSEE, OF PHILADELPHIA, PENNSYLVANIA.

APPARATUS FOR REGULATING THE FLOW OF CURRENT IN ELECTRIC CIRCUITS.

SPECIFICATION forming part of Letters Patent No. 743,887, dated November 10, 1903.

Application filed March 1, 1901. Serial No. 49,487. (No model.)

*To all whom it may concern:*

Be it known that I, ISIDOR KITSEE, of the city and county of Philadelphia, State of Pennsylvania, have invented certain new and useful Improvements in Apparatus for Regulating the Flow of Current in Electric Circuits, of which the following is a specification.

My invention relates to an improvement in electric circuits, and relates more especially to apparatus for regulating the flow of current in accordance with the need of the consuming devices in use.

My invention can be employed in any such circuits wherein alternating, undulatory, intermittent, pulsatory, or multiphase electric currents of any required potential and derived from any convenient source are transformed or converted.

Alternating or multiphase currents of very high potential are to-day converted into potential of the required electromotive force and then rectified into straight currents if the electric energy should be used for the purpose of arc-lighting, for the reason that the feeding-arcs with alternating current still possess disadvantages not easily overcome; but in this system—that is, the system of rectifying currents derived from a transformer and using these rectified currents for arc-lights—the disadvantage arises that the impressed electromotive force of the current to be rectified is a constant one and the electromotive force of the direct current does not vary according to the needs. To obviate this difficulty, different modes were suggested, and some of them are to-day in actual use. One of these methods is practiced to-day by the General Electric Company, and consists in placing the transformer into a receptacle filled with oil and moving the secondary toward or away from the primary. A second method consists in changing the angle by rotating the secondary. In my invention the primary as well as the secondary can remain stationary and the regulation is automatic.

Generally speaking, therefore, the object of my invention is to automatically regulate the flow of the alternating current in the consuming-circuit according to the number of consuming devices placed in said circuit.

Figure 1:
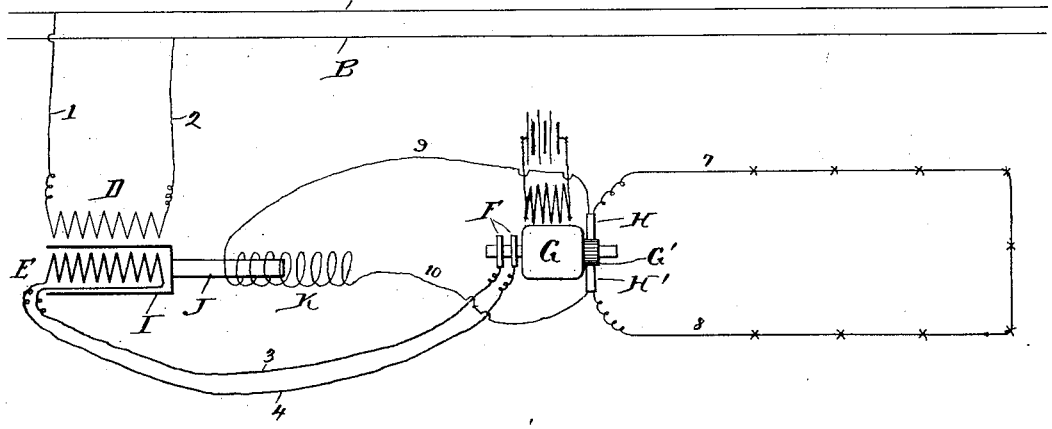
Figure 2:
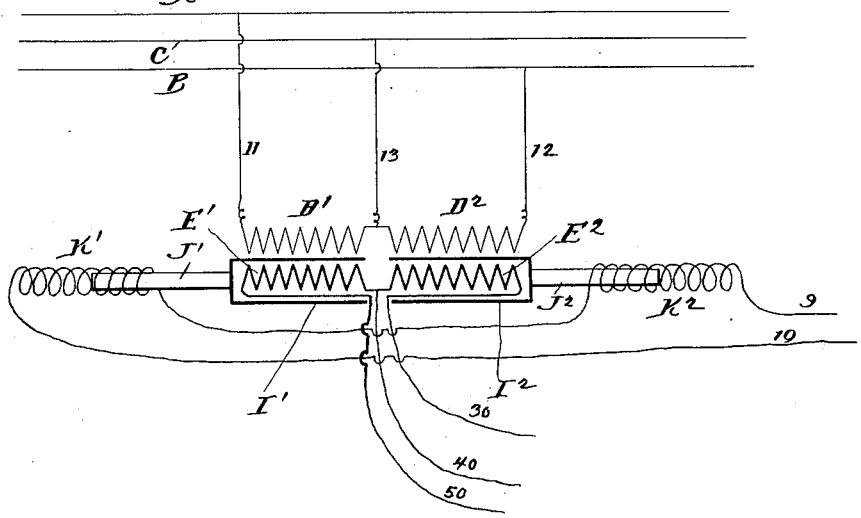
Figure 3:
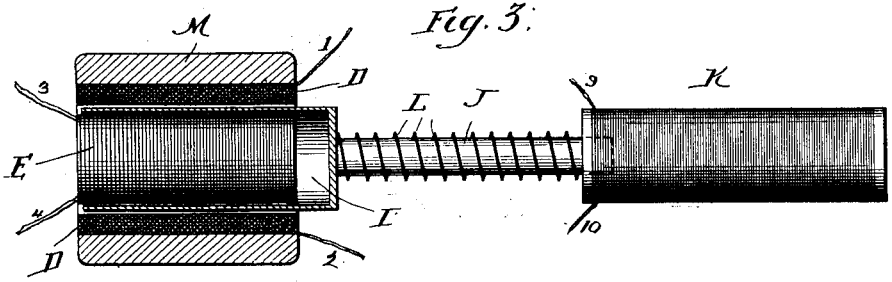

Referring to the drawings, Figure 1 is a diagram showing my apparatus applied to an ordinary two-wire alternating current. Fig. 2 is a diagram showing my apparatus applied to a multiphase current. Fig. 3 is a detail sectional view of a transformer with my invention applied thereto.

In Fig. 1, A and B represent the main wires. D is the primary coil of the transformer, and E the secondary coil, which is connected to the collecting-rings F by the wires 3 and 4. G is the rectifier. G' is the commutator thereof, and H and H' are the brushes. I is a hollow shell which is adapted to surround the secondary coil E. J is an armature secured to this hollow shell I. K is a solenoid adapted to attract the armature J. L is a spring interposed between the solenoid and the shell I for the purpose of returning the shell to its former position when the current is decreased in the solenoid. This spring is shown in Fig. 3. M is the usual iron surrounding the transformer. 1 and 2 are wires leading from the main wires A and B to the primary coil D. From the brushes H and H' the wires 7 and 8 go to the lamp-circuit. Wires 9 and 10 lead from the brushes H and H' to the solenoid K. In Fig. 1 the wires A and B are supposed to carry an alternating current.

In Fig. 2, A, B, and C represent the main wires, which are supposed to carry a multiphase current. The wires 11 and 12 and 13 extend from these main wires to the primary coils D' and D². E' and E² are the secondary coils, from which wires 30, 40, and 50 lead to the collecting-rings of the rectifier, substantially as described in Fig. 1. I' and I² are the dampers or shells adapted to cover the secondary coils E' and E². J' and J² are the armatures connected to these shells, and K' and K² are the solenoids adapted to attract the said armatures. Wires 9 and 10 lead from the solenoid to the brushes H and H', as described in Fig. 1.

Fig. 3 illustrates in detail the device with which I accomplish my purpose. The shell I, which I call the "damper," preferably consists of a hollow copper tube. As said above, this tube is connected to the core of the electromagnet. This electromagnet is, as illustrated in Fig. 1, connected in shunt as to the consuming-circuit, and the resistance of the coil should be such that a predetermined current should flow through the same if any of the consuming devices are placed in the consuming-circuit. If this consuming-circuit is an arc-circuit and the consuming devices consist of arc-lamps, it is understood that the more arc-lamps placed in the circuit to be operated by the current the greater will be the ratio of the resistance of this circuit as compared with the resistance of the solenoid K, and the greater the number of arc-lamps cut out of the circuit the smaller will be the resistance of the consuming-circuit as compared with the solenoid K. The *modus operandi* therefore is as follows: If no arc-lamp is placed in the consuming-circuit, no current of an appreciable value will flow to the high-resistance coils of the electromagnet K and the damper I will be inserted almost entirely between the primary and secondary D and E, thereby shielding the secondary from the influence of the primary to the greatest extent; but as soon as an arc-lamp or other consuming device is placed in the consuming-circuit the resistance of the same will be increased and the solenoid K will receive a small portion of the current, thereby drawing the core toward its center, which will result in the partial withdrawal of the damper from between the primary and secondary, and if a second consuming device is placed into the circuit the resistance will be doubly increased, and a greater amount of current will therefore flow through the electromagnet, resulting again in a further withdrawal of the damper. It is unnecessary for me to describe more in detail this working, as the law governing the flow of the current in a shunt is well known to persons versed in the art.

I have illustrated the device actuating the damper as consisting of a simple straight coil; but the device may be made in different shapes—as, for instance, in the shape of a half-circle—without departing from the scope of my invention.

Having now described my invention, what I claim as new, and desire to secure by Letters Patent, is—

1. In combination with a consuming-circuit, an electromagnetic device connected in shunt to said consuming-circuit, said electromagnetic device being adapted to move to and fro a metallic conductor placed between the primary and secondary of a converter.

2. An automatic damping device consisting of an electromagnetic device, a metallic tube secured to the movable part of said device, and adapted to be placed between the primary and secondary of a converter, the coil of said electromagnetic device being adapted to be connected to the consuming-circuit.

3. In electricity, an automatic device to regulate the influence of the primary of a converter on the secondary of said converter, said device consisting of an electromagnet, a metallic shield secured to the movable part of said electromagnet and adapted to be placed between the primary and secondary of said converter.

In testimony whereof I hereby sign my name, in the presence of two subscribing witnesses, this 29th day of August, A. D. 1900.

ISIDOR KITSEE.

Witnesses:
EDITH R. STILLEY,
WALLACE B. ELDRIDGE.